(12) United States Patent
Rimkus et al.

(10) Patent No.: US 7,197,922 B2
(45) Date of Patent: Apr. 3, 2007

(54) TIRE ROTATION DETECTION USING TIRE TEMPERATURE PROFILING

(75) Inventors: Robert A. Rimkus, Macomb, MI (US); J. David Rosa, Clarkston, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/130,973

(22) Filed: May 17, 2005

(65) Prior Publication Data

US 2006/0260389 A1  Nov. 23, 2006

(51) Int. Cl.
*G01M 17/02* (2006.01)
(52) U.S. Cl. .................... 73/146; 73/146.5
(58) Field of Classification Search ....... 73/146–146.8; 340/444–447
See application file for complete search history.

(56) References Cited

U.S. PATENT DOCUMENTS

| | | | |
|---|---|---|---|
| 5,569,848 A * | 10/1996 | Sharp | 73/146.2 |
| 6,385,511 B1 * | 5/2002 | Fondeur et al. | 701/1 |
| 6,672,149 B2 * | 1/2004 | Hottebart et al. | 73/146 |
| 6,907,778 B2 * | 6/2005 | Kogure et al. | 73/146 |

* cited by examiner

*Primary Examiner*—Edward Lefkowitz
*Assistant Examiner*—Jermaine Jenkins
(74) *Attorney, Agent, or Firm*—Timothy J. Marsh

(57) ABSTRACT

Methods and apparatus are provided for detecting whether a tire rotation event or tire inflation even has occurred on a vehicle. The method comprises determining a first front average temperature (FAT) of a first front tire and a second front tire, determining a first rear average temperature (RAT) of a first rear tire and a second rear tire, and calculating a first ratio of the first FAT to the first RAT. The method further comprise determining a second FAT of the first front tire and the second front tire after determining the first FAT, determining a second RAT of the first rear tire and the second rear tire after determining the first RAT, calculating a second ratio of the second FAT to the second RAT, and identifying the tire rotation event based at least in part upon a comparison of the first ratio and the second ratio.

11 Claims, 2 Drawing Sheets

TIRE ROTATION DETECTION USING TIRE TEMPERATURE PROFILING

TECHNICAL FIELD

The present invention generally relates to tire pressure monitoring, and more particularly relates to methods and apparatus for detecting a tire rotation event using tire temperature profiling, and method and apparatus for detecting an inflation condition of a tire.

BACKGROUND

Proper vehicle maintenance generally includes periodic rotation of the tires. Periodic tire rotation is desired and recommended for several reasons. For example, periodic tire rotation provides regular wear and increases the tire life.

Vehicle maintenance also generally includes periodic adjustment of tire pressure in order to provide proper inflation. Tires generally provide improved performance when inflated properly and loss of pressure can degrade tire performance. Moreover, sudden or unexpected air pressure loss in a tire can also lead to poor tire performance and additional degradation.

Tire pressure has traditionally been tested manually. Likewise, tire rotation decisions have depended on criteria such as visual inspection of tire wear and/or mileage. However, such manual techniques are subject to limitations inherent in manual procedures.

Accordingly, it would be desirable to develop a non-manual system for detecting a tire rotation even and an associated method. In addition, it would be desired to develop a non-manual system that detects an inflation condition (e.g., air loss and air gain) in a tire. Furthermore, it is desirable to detect tire inflation and rotation information using a temperature profile such that changes in the temperature profile indicate a tire rotation. Moreover, other desirable features and characteristics of the present invention will become apparent from the subsequent detailed description and the appended claims, taken in conjunction with the accompanying drawings and the foregoing technical field and background.

BRIEF SUMMARY

A method is provided for detecting a tire rotation event for a first front tire and a second front tire of a vehicle and a first rear tire and a second rear tire of the vehicle. The method comprises determining a first front average temperature (FAT) of the first front tire and the second front tire, determining a first rear average temperature (RAT) of the first rear tire and the second rear tire, and calculating a first ratio of the first FAT to the first RAT. The method also comprises determining a second FAT of the first front tire and the second front tire after the determining the first FAT, determining a second RAT of the first rear tire and the second rear tire after the determining the first RAT, and calculating a second ratio of the second FAT to the second RAT. Lastly, the method further comprises identifying the tire rotation event based at least in part upon a comparison of the first ratio and the second ratio.

In addition to the method for detecting a tire rotation event for a first front tire and a second front tire of a vehicle and a first rear tire and a second rear tire of the vehicle, a system is provided to detect a tire rotation event for a first front tire and a second front tire of a vehicle and a first rear tire and a second rear tire of the vehicle. The system comprises a first sensor disposed to measure at least one of a first temperature of the first front tire, a second temperature of the second front tire, a third temperature of the first rear tire, a fourth temperature of the second rear tire, and a processor coupled to the first sensor. The processor is configured to determine a first front average temperature (FAT) with the first temperature and the second temperature, determine a first rear average temperature (RAT) with the third temperature and the fourth temperature, and calculate a first ratio of the first FAT to the first RAT. The processor is also configured to determine a second FAT with the first temperature and the second temperature after determining the first FAT, determine a second RAT with the third temperature and the fourth temperature after determining the first RAT, and calculate a second ratio of the second FAT to the second RAT. Lastly, the processor is configured to identify the tire rotation event based at least in part upon a comparison of the first ratio and the second ratio.

In addition to methods and apparatus for detecting rotation events, methods and apparatus are provide for detecting an inflation event of a tire. The method comprises determining a first temperature of the tire, determining a first pressure of the tire, and determining an offset using at last the first temperature and the second temperature. The method also comprises determining a second temperature of the tire after determining the first temperature, determining a second pressure of the tire after determining the first pressure, and calculating an estimated pressure ($P_{est}$) using the second temperature and the offset. Lastly, the method comprises identifying the inflation invent of the tire based at least in art on a comparison using the estimated pressure ($P_{est}$) and the second pressure.

The apparatus for detecting an inflation event comprises a first sensor configured to determine a temperature of the tire, a second sensor configured to determine a pressure of the tire, and a processor coupled to the first sensor and the second sensor. The processor is configured to receive a first temperature of the tire from the first sensor, receive a first pressure of the tire from the second sensor, and calculate an offset using at last the first temperature and the second temperature. The processor is further configured to receive a second temperature of the tire from the first sensor after receiving the first temperature, receive a second pressure of the tire from the second sensor after receiving the first pressure, calculate an estimated pressure (PEST) using the second temperature and the offset, and identify the change in pressure of the tire based at least in art on a comparison using the estimated pressure (PEST) and the second pressure.

BRIEF DESCRIPTION OF THE DRAWINGS

The present invention will hereinafter be described in conjunction with the following drawing figures, wherein like numerals denote like elements whenever possible, and wherein.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Generally, tire temperatures in front wheel drive vehicles display a bias toward the front tires. On average, front tires operate at a higher temperature than rear tires. Factors such as engine heat, vehicle loading, and front wheel tire slip cause this bias. A tire rotation temporarily distorts this temperature bias. Thus, a change in temperature ratios can be used to detect a tire rotation event. In one exemplary embodiment, this is accomplished by profiling the tire temperatures of the front tires against the tire temperatures of the rear tires as subsequently described in this detailed description. The initial profile is subsequently used as a comparison value with respect to future front tire and rear tire temperature profiles with a predetermined deviation in the profile is interpreted a tire rotation event.

Figure 1:
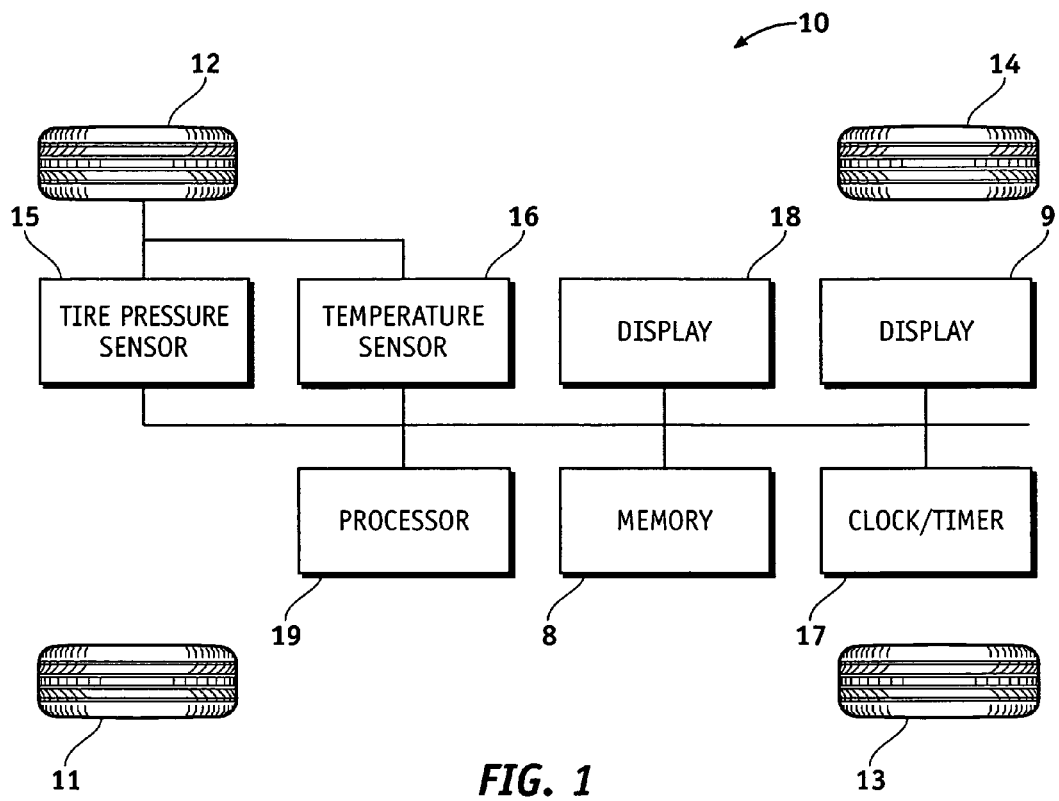
FIG. 1 is an illustration of a system for detecting a tire rotation event according to an exemplary embodiment of the present invention.

Referring to FIG. 1, a tire pressure and temperature monitoring system 10 is illustrated in accordance with an exemplary embodiment of the present invention. The system 10 is interconnected with a vehicle having at least four tires. However, other tire configurations and numbers can be utilized in accordance with the present invention. The four tires include a left front tire 11, and right front tire 12, a left rear tire 13, and right rear tire 14. The system 10 preferably includes, but not necessarily includes, a tire pressure sensor 15, a temperature sensor 16, a clock/timer 17, a display 18, a processor 19, a memory 8, and a user interface 9. The system 10 may be a stand alone system or may be incorporated as part of other vehicle systems (not shown).

The tire pressure sensor 15 measures pressure of the tire 12, and the temperature sensor 16 measures the temperature within a tire. The tire pressure sensor and tire temperature sensor can also measure the pressure and temperature of other tires (11,13,14) of the vehicle or each of the tires (11,13,14) can have pressure and temperature measured with sensors dedicated to a tire. The clock/timer 17 may be used to measure times that action is taken by the system 10. The display 18 may be used to convey information from the system 10 to a user such as a vehicle driver, operator, or passenger. The processor 19 may be used to control and coordinate components of the system 10. The memory 8 may be used to store data or information such as, but not limited to, time, tire temperature and pressure. The user interface 9 may be used to receive information.

The pressure sensor 15 and temperature sensor 16 may also be linked so that pressure and temperature data is provided to processor 19 and/or memory 8. The method of transmitting such data may include known methods such as a wireless transmission (e.g., RF transmission) of data. While FIG. 1, shows that pressure sensor 15 and temperature sensor 16 are linked to a single tire, other configurations are possible. Thus, for example, each tire may have individual pressure and temperature sensors linked thereto. The tire temperature and pressure sensors may include components not shown in the figures, such as senders and receivers, for picking up data within the tire and sending it to other points on the vehicle.

A method in accordance with an exemplary embodiment of the present invention uses the temperature data of the tires to make further determinations regarding the relationship of the tires. In one exemplary embodiment, the method is executed by processor 19. More specifically, the method includes using temperature data to develop a front-to-rear temperature ratio, preferably with the tires in a known state.

In one exemplary embodiment, the tire temperatures are used to calculate a Front Average Tire Temperature (FAT) as set forth in equation (1).

$$FAT=(LFT+RFT)/2 \qquad (1)$$

where LFT is the Left Front Tire Temperature and RFT is the Right Front Tire Temperature. The tire temperatures are also used to calculate a Rear Average Tire Temperature (RAT) as set forth in equation (2).

$$RAT=(LRT+RRT)/2 \qquad (2)$$

The FAT and RAT can then be used to determine a Front to Rear Temperature Ratio (FRT) as set forth in equation (3).

$$FRT=FAT/RAT \qquad (3)$$

The initial calculation of the FRT is preferably conducted at a predetermined time, which is preferably the time that the internal temperature of the tires has risen above a predetermined temperature indicative that the tires have "warmed up." This temperature can be any number of temperatures depending on the vehicle, tires, and outside environment. The determination that the temperature has exceeded the predetermined temperature can be accomplished using any number of techniques. For example, the timer can track the amount of time that the vehicle has been operating and expiration of a specified period can be associated with the temperature exceeding the predetermined temperature.

After the initial calculation of the FRT and RAT, a second FRT and RAT are calculated in accordance with an exemplary embodiment of the present invention. Hence, there have been calculated two FRT values and two RAT values (e.g., a first FRT value (FRT1) calculated at first time ($T_1$), preferably after the tires are "warm" as previously described, and a second FRT value (FRT2) calculated at a second time ($T_2$) after the first time). The two FRT values are then compared and this comparison is used at least in part to identify a tire rotation event.

The comparison preferably utilizes a Tire Rotation Ratio Hysteresis (TRRH) factor. This TRRH factor is preferably developed empirically based upon measurements conduct in under various conditions such that the tire rotation event is identifiable with the FRT values as adjusted by the TRRH. The TRRH value is preferably stored in memory 8 that can be accessed by the processor.

The relationship using the TRRH factor that is preferably used to identify the tire rotation event is provided in equation (4).

$$FRT2<FRT1-TRRH \qquad (4)$$

If the relationship specified in equation (4) is true, a tire rotation has occurred in accordance with an exemplary embodiment of the present invention. Conversely, if the relationship specified in equation (4) is false, a tire rotation event has not occurred in accordance with an exemplary embodiment of the present invention.

The following is an example of the method for detecting the tire rotation event with illustrative values. Assuming that the TRRH has been empirically determined to be 0.05 and assume that the tire temperature has exceeded the predefined temperature, which indicates the tires are warm at the first time ($T_1$). The measured temperatures of the tires at the first time are as follows: Left Front Tire Temperature=33° C.; Right Front Tire Temperature=33° C.; Left Rear Tire Temperature=31° C.; and Left Rear Tire Temperature=31° C. Based upon these measured tire temperatures, the system determines that the FAT=33° C., the RAT=31° C., and the FRT1=1.0645.

At a second time ($T_2$) after the first time ($T_1$), the measured temperatures of the tires are as follows: Left Front Tire Temperature=31° C.; Right Front Tire Temperature=31° C.; Left Rear Tire Temperature=33° C.; and Right Rear Tire Temperature=33° C. Based upon these measured tire temperatures, the system determines that the FAT=31° C., the RAT=33° C., and FRT2=0.9394. If these calculated values are applied to equation (4), the relationship is true and a tire rotation even is identified by the system.

Utilization of the front-to-rear tire ratio to determine a tire rotation event has numerous benefits. For example, this ratio helps to reduce noise in individual tire temperature signals. Further, the ratio lessens the impact that a single tire temperature deviation has on the overall analysis. In those vehicles where front-to-rear temperatures track very closely with each other, there is less of an advantage. In such a vehicle, the calculated ratios hover close to 1.0 regardless of location.

Figure 2:
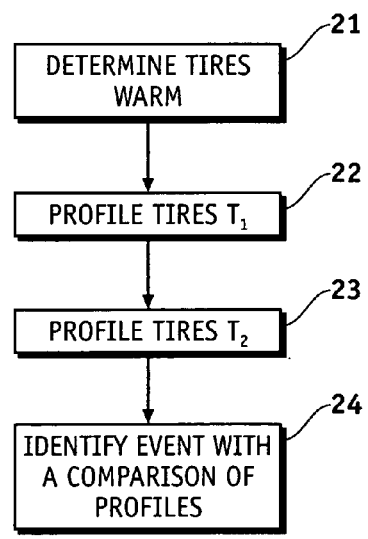
FIG. 2 is a flow chart for a method to detect a tire rotation event according to an exemplary embodiment of the present invention.

Referring to FIG. 2, a flow chart is provided based upon the steps previously described in greater detail. Initially, the method begins determines whether the tire temperatures have exceeded a predetermined temperature (i.e., the temperatures are "warm") 21, which can be accomplished using any number of techniques as previously describe in this detailed description (e.g., the timer 17 records elapsed time since initialization and the tires are considered to be warm after the timer 17 exceeds a predetermined period) or the system can measure the tire temperatures.

After the tire temperatures have exceeded a predetermined temperature (i.e., the tires are determined to be warm) 21, the tire temperature profile is determined at a first time ($T_1$) 22. Determining the tire temperature profile at the first time ($T_1$) 22 includes, but is not limited to, determining the FAT, RAT, and FRT.

After the tire temperature profiled is determined at the first time ($T_1$) 22, the tire temperature profile is determined at a second time ($T_2$) 23. Preferably, the second time ($T_2$) is specified as a desired period after the first time ($T_1$). As with the tire temperature profile at the first time ($T_1$) 22, the tire temperature profile at the second time ($T_2$) includes, but is not limited to, determining the FAT, RAT, and FRT.

After the tire temperature profile is determined at the first time ($T_1$) 22 and the tire temperature profile is determined at the second time ($T_2$) 23, the profiles at each time are compared and the tire rotation event is identified based at least in part upon this comparison 24. The comparison can take any number of forms. For example, the comparison can be the relationship set forth in equation (4).

The identification of the tire rotation event or determination that a tire rotation event has not occurred can be used to trigger further signals or actions. For example, a tire rotation message may be presented to the operator on display 18 that is indicative of whether or not a tire rotation event has been identified by the system. Optionally, the message may prompt a further input from the operator with an interface 9. For example, the message can confirm or override the identification of the tire rotation event. Additionally, if the time for a recommended tire rotation has elapsed, the system 10 may prompt the operator of that fact, as well as whether the system detects that a tire rotation has taken place.

In accordance with another exemplary embodiment of the present invention, the system 10 may also provide information related to an inflation condition of one or more tires in addition to or as an alternative to the detection of a tire rotation event as previously described in this detailed description. The system and/or the associated method may also be used to monitor tire pressure and temperature. For example, based on a comparison to calibrated values, a technique may determine the occurrence of an inflation condition such as a tire fill event. This event can then further be used to trigger an adaptive learning procedure within a tire inflation monitoring (TIM) system and/or reset the TIM system.

Figure 3:
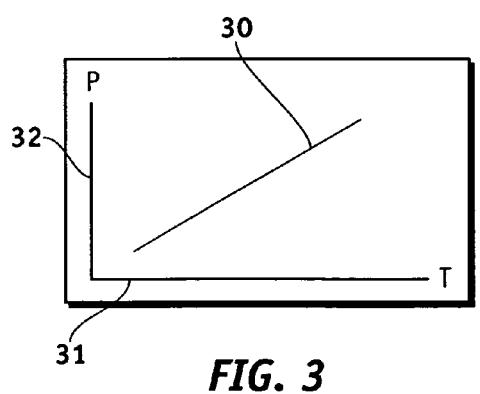
FIG. 3 is a graph illustrating a linear relationship for temperature and pressure in a vehicle tire.

More specifically, and by way of example, an automobile industry rule-of-thumb provides that tire pressure will change about 1 psi for every 5.555556° C. change in tire temperature. Accordingly, the slope (m) of this relationship is (1 psi/5.555556° C.)=0.18 as shown in FIG. 3, the line 30 of which is represented by the general equation of y=mx+b, where b is the offset from the x-axis 31, and m represents the slope of the line. This general line equation may further be applied to the temperature/pressure relationship. The equation may be modified where, as in FIG. 3, the y axis 32 is pressure and the x-axis 31 is temperature. Accordingly, the general line equation becomes the equation as set forth in equation (5).

$$P=0.18T+b \quad (5)$$

If both the tire pressure and temperature are determined for a tire or tires in a known state, the data can be used to calculate the offset (b) with equation (5) and stored for future use. It will be appreciated that the slope (m) used in equation (5) (e.g., 0.18) is an approximation based on industry experience. Other values for the slope (m) can be used in accordance with the present invention.

The system can use equation (5) so as to test and monitor pressure changes. The system can continue to monitor the temperature of a tire or tires using temperature data such that the system can calculate an estimated pressure ($P_{est}$) of the tire or tires. The estimated pressure can then be compared to an actual or measured pressure.

If the actual pressure deviates from the estimated pressure by a set amount, the system and/or method identifies an air loss event. Once an air loss event has been identified, and the actual pressure then increases to within a set amount of the estimated pressure, a tire fill event is identified in accordance with an exemplary embodiment of the present invention. A tire fill event can also act to clear the air loss event and air loss flag. The set amount of air loss may be different from the set amount set for an air gain. Each such set amount is preferably a calibrated amount that corresponds to actual air loss events and air gain events and avoids faulty signals.

Figure 4:
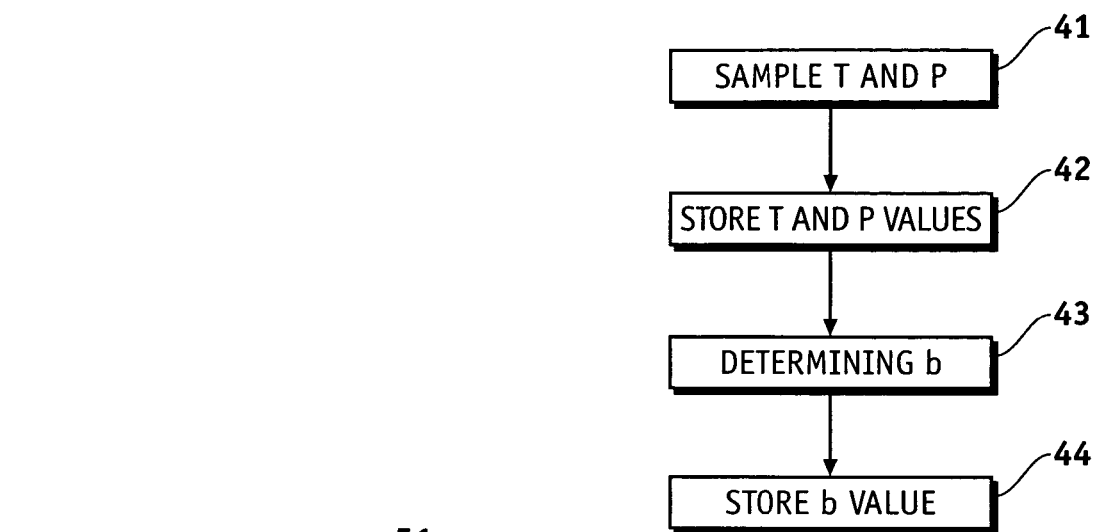
FIG. 4 is a flow chart illustrating steps in a method to determine an offset according to an exemplary embodiment of the present invention.

Referring to FIG. 4, a method is illustrated to calculate the offset (b) in accordance with an exemplary embodiment of the present invention. Initially, the method conducts a sampling of the temperature (T) and pressure (P) 41. The pressure and temperature data may be sampled using known methods, techniques or apparatus. This data is then saved for future use 42. Once the sampling 41 is conducted and the data is saved, the offset (b) value is calculated using the temperature/pressure relationship as set forth in equation (5)

43 and the offset value is stored as a final step 44. After the offset (b) is determined and stored, it can be used to determine any number of inflation conditions.

Figure 5:
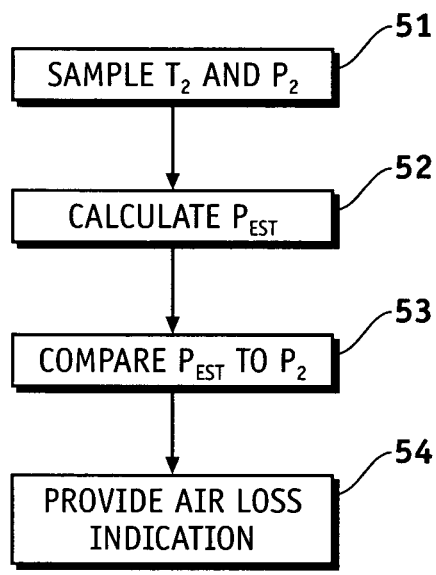
FIG. 5 is a flow chart illustrating steps in a method to detect an air loss event in a tire according to an exemplary embodiment of the present invention.

For example, FIG. 5 illustrates a method to detect an air loss event of a tire. This method begins with a sampling of pressure and temperature at a second time after determining the offset (b) 51 in accordance with the steps described with reference to FIG. 4. With the pressure and the temperature determined at the second time, the method proceeds with the calculation of the estimated pressure ($P_{est}$). The estimated pressure ($P_{est}$) is calculated using the temperature data ($T_2$) obtained at the second time and also calculated using the offset (b) calculated and stored in the method of FIG. 4. Ultimately, the estimated pressure ($P_{est}$) is compared to the pressure ($P_2$) obtained at the second time and an air loss event is identified based at least in part upon this comparison. For example, the comparison provided in equation (6) can be used in the identification of an air loss event, where $K_{LOSS}$ represents the predetermined value that specifies the criteria for an air loss event.

$$P_{EST} - P_2 > K_{LOSS} \quad (6)$$

If the condition of equation (6) is true, then an air loss event is identified in accordance with an exemplary embodiment of the present invention. A signal indicating such an air loss event may be generated or otherwise transmitted to other system components or for presentation to an individual on a display or other device.

Figure 6:
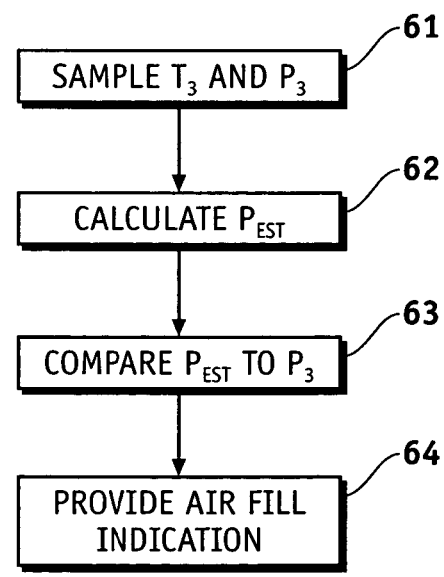
FIG. 6 is a flow chart illustrating steps in a method to detect an air fill event in a tire according to an exemplary embodiment of the present invention.

Another inflation condition that can be detected in accordance with an exemplary embodiment of the present invention is an air fill event. Referring to FIG. 6, a method is provided to detect an air fill event. Initially, a third temperature ($T_3$) and third pressure ($P_3$) are sampled at a third time. Using the third temperature (T3), a second pressure estimate ($P_{EST}$) is calculated with the previously calculated offset (b) 62. The second pressure estimate ($P_{est}$) is compared to the third pressure data ($P_3$) obtained at the third time and an air fill event is identified based at least in part upon this comparison. This second pressure estimate ($P_{EST}$) is then compared to the third pressure ($P_3$). For example, the comparison provided in equation (7) can be used in the identification of an air loss event, wherein $K_{FILL}$ represents a predefined value that specifies the criteria for an air fill event.

$$P_{EST} - P_2 < K_{FILL} \quad (7)$$

If the condition of equation (7) is true, then an air fill event is identified in accordance with an exemplary embodiment of the present invention.

As an example of detecting an air loss event and air fill event, a first temperature ($T_1$) is found to be 23° C. and a first pressure ($P_1$) is found to be 30 psi at a first time. Using equation (5), the offset is found to be 25.86. At a later time, a second temperature ($T_2$) is found to be 27° C. and a second pressure ($P_2$) is found to be 26 psi. Using the second temperature ($T_2$) and equation (5), a first pressure estimate ($P_{est}$) is calculated to be 30.72 psi. Wit a $K_{LOSS}$ value set at 3 psi, the second pressure ($P_2$) is then used in the comparison with $K_{LOSS}$ and $P_{EST}$ according to equation (6) (i.e., $P_{est} - P_2 > K_{LOSS}$). With the values provided in this example, (30.72−26) is greater than 3, so an air loss event is found to exist. At third time after the second time, a third temperature ($T_3$) and third pressure ($P_3$) can be determined and compared to equation (7) (i.e., $P_{EST} - P_3 < K_{FILL}$). If equation (7) is satisfied, then a tire fill event is detected by the system and/or methods of the present invention.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method for detecting a tire rotation event for a first front tire and a second front tire of a vehicle and a first rear tire and a second rear tire of the vehicle, comprising:

measuring a first temperature of the first front tire, a first temperature of the second front tire, a first temperature of the first rear tire, and a first temperature of the second rear tire;

determining a first front average temperature (FAT) based on said first temperature of the first front tire and said first temperature of the second front tire;

determining a first rear average temperature (RAT) based on said first temperature of the first rear tire and said first temperature of the second rear tire;

calculating a first ratio of said first FAT to said first RAT;

measuring a second temperature of the first front tire, a second temperature of the second front tire, a second temperature of the first rear tire, and a second temperature of the second rear tire;

determining a second FAT based on said second temperature of the first front tire and said second temperature of the second front tire after said determining said first FAT;

determining a second RAT based on said second temperature of the first rear tire and said second temperature of the second rear tire after said determining said first RAT;

calculating a second ratio of said second FAT to said second RAT;

identifying the tire rotation event based at least in part upon a comparison of said first ratio and said second ratio.

2. The method according to claim 1, further comprising generating a tire rotation indicator on a display after said identifying the tire rotation event.

3. The method according to claim 1, further comprising reducing said first ratio by a tire rotation ratio hysteresis factor prior to said comparison of first ratio and said second ratio.

4. The method according to claim 1, wherein said determining said first front average temperature (FAT) occurs after said first temperature of the first front tire and said first temperature of the second front tire exceeds a predetermined temperature.

5. A system configured to detect a tire rotation event for a first front tire and a second front tire of a vehicle and a first rear tire and a second rear tire of the vehicle, comprising:

a first sensor disposed to measure at least one of a first temperature of the first front tire, a second temperature of the second front tire, a third temperature of the first rear tire, and fourth temperature of the second rear tire; and a processor coupled to said first sensor, said processor configured to:

determine a first front average temperature (FAT) with said first temperature and said second temperature;

determine a first rear average temperature (RAT) with said third temperature and said fourth temperature;

calculate a first ratio of said first FAT to said first RAT;

determine a second FAT with said first temperature and said second temperature after said determining said first FAT;

determine a second RAT with said third temperature and said fourth temperature after said determining said first RAT;

calculate a second ratio of said second FAT to said second RAT;

identify the tire rotation event based at least in part upon a comparison of said first ratio and said second ratio.

6. The system according to claim 5, further comprising an RF transmitter coupling said first sensor and said processor.

7. The system according to claim 5, wherein the processor further comprises a timer such that the processor determines that tires have exceeded a predetermined temperature after expiration of a set time.

8. The system according to claim 5, wherein said processor is configured to determine said first front average temperature (FAT) after a temperature of at least one of said first front tire, second front tire, first rear tire, and second rear tire exceeds a predetermined temperature.

9. The system according to claim 8, wherein said processor determines said temperature of at least one of said first front tire, second front tire, first rear tire, and second rear tire has exceeded said predetermined temperature based at least in part upon an expiration of a predetermined period.

10. The system according to claim 8, further comprising a display operably coupled to said processor, said processor further configured to generate a tire rotation indicator on said display after identifying the tire rotation event.

11. The system according to claim 5, wherein said processor is further configured to reduce said first ratio by a tire rotation ratio hysteresis factor prior to said comparison of first ratio and said second ratio.

* * * * *